Aug. 15, 1967  B. O. ROSAEN  3,335,642
CYLINDER CONSTRUCTION
Filed Jan. 8, 1965  3 Sheets-Sheet 1

INVENTOR
BORJE O. ROSAEN
BY
*Hauke & Hauke*
ATTORNEYS

Aug. 15, 1967 B. O. ROSAEN 3,335,642
CYLINDER CONSTRUCTION
Filed Jan. 8, 1965 3 Sheets-Sheet 2

INVENTOR
BORJE O. ROSAEN
BY
*Hauke & Hauke*
ATTORNEYS

INVENTOR
BORJE O. ROSAEN
BY
ATTORNEYS

United States Patent Office 3,335,642
Patented Aug. 15, 1967

3,335,642
CYLINDER CONSTRUCTION
Borje O. Rosaen, Ann Arbor, Mich. (1776 E. Nine Mile Road, Hazel Park, Mich. 48030)
Filed Jan. 8, 1965, Ser. No. 424,281
15 Claims. (Cl. 92—110)

The present invention relates to fluid cylinders, particularly to those fluid cylinders carrying a fluid actuated two-way piston member, and more particularly to an improved construction for such cylinders including means for equalizing the effective area on each side of the piston member.

Fluid cylinders are generally provided with a piston member movable within the cylinder in response to fluid being directed and exhausted from opposite sides of the piston member. Movement of the piston member is transmitted through a rod connected to the piston to produce the desired mechanical work.

A problem which has long been associated with such fluid cylinders and one which has not heretofore been satisfactorily solved is that connecting the rod member to one side of the piston necessarily reduces the effective area on that side of the piston member by an amount equal to the transverse cross sectional area of the rod member. This means that with equal rate of fluid flow being used to actuate the piston member in each direction the piston member will move in the two directions at different rates of speed. When the piston member is moving in a direction toward the rod member end of the cylinder, the larger effective area on the side of the piston member opposite the rod member will cause the piston member to move faster in this direction than when the piston member is moving in the opposite direction.

Further, this difference in the effective area on opposite sides of the piston member also has the result that if equal external forces are applied in opposite directions to the end of the rod member and to the end of the cylinder housing opposite the rod member, a relative movement of these members will be produced. As the end of the cylinder having the smaller effective area will not have sufficiently intensified pressures to act past the piston seals as compared to the pressures produced by an equivalent force acting on the other end of the cylinder, the net effect then would be to have the piston change positions upon equal external forces acting upon it. The change in volume held by a locked cylinder would be accommodated by having a vacuum created on the larger displacement side of the cylinder. This is an undesirable result in many applications where it is desirable that such external forces if equal have no effect on the operation of the fluid cylinder.

Heretofore several different approaches have been utilized in attempting to solve this problem. One common approach is to provide a second rod member equal in cross sectional area and connected to the side of the piston member opposite the working rod member. Such a construction is not entirely satisfactory. Although the effective area on each side of the piston member can be equalized in this manner, the resulting fluid cylinder is substantially double in length over such a fluid cylinder without the second rod member. This is because the end of the second rod member cannot be subjected to the actuating fluid pressure and therefore the second rod member must be of sufficient length to maintain the free end unexposed throughout the entire range of movement of the piston member.

The present invention provides a fluid cylinder construction in which an area equal to the cross-sectional area of the rod member is added to the effective area of the rod member side of the piston member. This is accomplished by providing an outside tubular member encompassing the tubular member defining the piston chamber. The outside tubular member is radially spaced from the inside tubular member and it is the cross sectional area between the tubular members which is added to the rod member side of the piston member. Although this increases the size of the fluid cylinder somewhat, the increase is in the transverse cross sectional area of the fluid cylinder and the overall length of the cylinder is left unchanged. Further, the increase is slight since the area is added at the radially outward portion of the cylinder and a slight increase in diameter in this area produces a relatively large increase in cross-sectional area.

It is an object then of the present invention to improve fluid cylinders having a piston member operable to move a rod member by providing means for increasing the effective area of the piston member on that side of the piston member connected to the rod member.

It is another object of the present invention to improve those fluid cylinders in which means are provided to equalize the effective area on each side of the piston member by providing a construction for such cylinders in which an effective area is added to the rod member side of the piston member.

It is yet another object of the present invention to improve the aforesaid types of fluid cylinders by providing such an area increasing means in the form of an outside tubular member encompassing the tubular member defining the piston chamber and means adding the cross sectional area between the tubular members to the effective area on one side of the piston member.

Still further objects and advantages of the present invention will readily occur to one skilled in the art to which the invention pertains upon reference to the following drawings in which like reference characters refer to like parts throughout the several views and in which.

Figure 1:
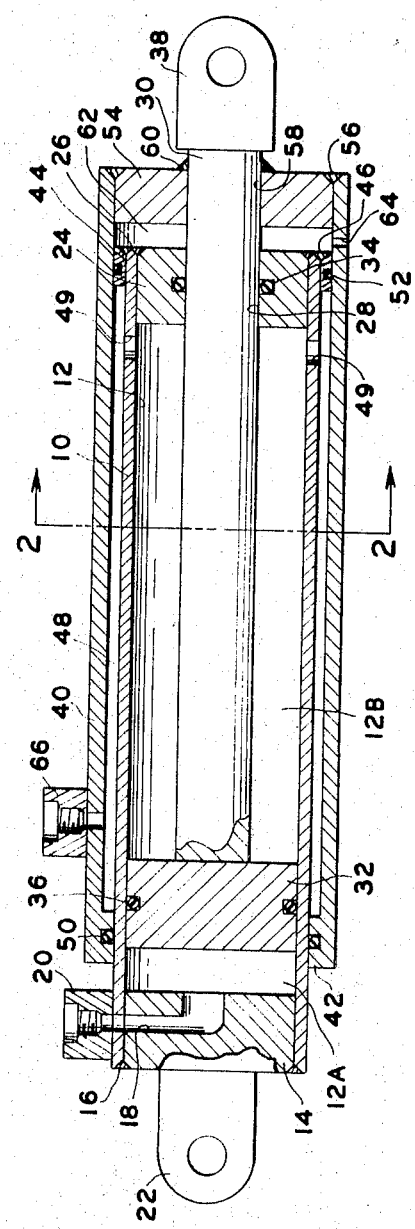
FIG. 1 is a longitudinal cross sectional view of one preferred embodiment of the present invention.
Figure 2:
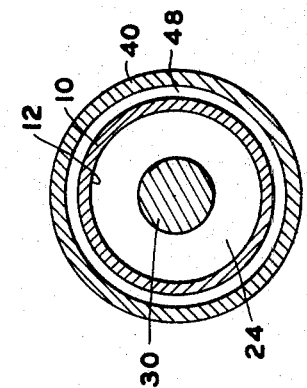
FIG. 2 is a transverse cross sectional view taken substantially on the line 2—2 of FIG. 1.

Now referring to the drawings for a more detailed description of the present invention, FIGS. 1 and 2 illustrate one preferred fluid cylinder as comprising an inner tubular member 10 defining a fluid chamber 12. The tubular member 10 is closed at one end by a closure member 14. The closure member 14 is secured to the end of tubular member 10 in a fluid tight manner such as by welding as indicated at 16. A mounting fixture 22 is formed at the exterior end of the closure member 14.

The opposite end of the tubular member 10 is closed by a guide member 24. The guide member 24 is secured to the end of the tubular member 10 in a fluid tight member such as by welding as indicated at 26. The guide member 24 is provided with an axially extending opening 28 which axially slidably receives an elongated rod member 30. The rod member 30 extends through the opening 28 into the fluid chamber 12 and is secured at its interior end to a piston member 32. An O-ring seal 34 carried by the guide member 24 prevents fluid leakage from the fluid chamber 12 along the rod member 30. The piston member 32 axially slidably engages the inner surface of the tubular member 10 and an O-ring seal 36 prevents fluid leakage past the piston member 32. This piston member 32 divides the fluid chamber 12 into two separated chambers 12A and 12B. The closure member 14 and the tubular member 10 are provided with a passage 18 connecting the chamber 12A with a port member 20 carried exteriorly of the tubular member 10. A connecting fixture 38 is carried at the exterior end of the rod member 30.

The inner tubular member 10 is telescopically received by an outer tubular member 40. The outer tubular member 40 is provided at one end with a radially inwardly extending flange portion 42 which axially slidably engages the outer surface of the inner tubular member 10. A ring member 44 is secured preferably by welding as indicated at 46 to the exterior surface of the inner tubular member 10 at the end adjacent the guide member 24. The flange portion 42 and the ring member 44 close the ends of an annular fluid chamber 48 formed intermediate the inner tubular member 10 and the outer tubular member 40. O-ring seals 50 and 52 carried by the flange portion 42 and the ring member 44 respectively prevent fluid leakage from the chamber 48. Annularly spaced ports 49 provided in the inner tubular member 10 connect the fluid chamber 12B to the annular chamber 48.

An end member 54 closes the end of the tubular member 40 opposite the flange portion 42 and is preferably secured to the tubular member 40 as by welding as indicated at 56. The end member 54 is provided with an axial opening 58 which receives the rod member 30. The rod member 30 and the end member 54 are preferably secured one to the other as by welding as indicated at 60.

An atmosphere chamber 62 is formed in the end of the tubular member 40 intermediate the guide member 24 and the end member 54 and a port 64 provided in the tubular member 44 connects the chamber 62 to atmosphere. A fluid port 66 is carried by the tubular member 40 and is connected to the chamber 48 in an area adjacent the flange portion 42.

The fluid ports 20 and 66 are adapted to be connected to a source of fluid flow through a conventional 4-way valve or other conventional directional change means (not shown). Assuming that the mounting fixture 22 is maintained in a fixed position, upon fluid being directed through the port 20 and through the passage 18 into the fluid chamber 12A and fluid being exhausted from the fluid chamber 12B through the ports 49, the chamber 48 and the fluid port 66, the piston member 32 will move axially to the right as the device is shown in FIG. 1. This movement of the piston member 32 will produce a corresponding axial movement of the rod member 30, the end member 54 and the outer tubular member 40 since these members are all secured together. By connecting the fixture 38 to means to be actuated, the desired mechanical work can be produced.

Upon fluid then being exhausted from the port 20 and being directed through the port 66 to the chambers 48 and 12, the piston member 32, the rod member 30 and the tubular member 40 will be moved to the left toward the position illustrated in FIG. 1. Without the provision of the tubular member 40 and more particularly the flange portion 42, this movement would be at a higher rate of speed or would require a lesser flow rate to obtain the same force output or to move at the same rate of speed than movement to the right. This is because the rod member 30 reduces the effective area of the piston member 32 on the rod member side of the piston member 32. However, by providing the flange portion 42 with an effective area exposed to the fluid in chamber 48 substantially equal to that of the piston member 32 lost through the connection of the rod member 30 and by connecting the tubular member 40 to the rod member 30 in the manner illustrated, an equalization of the areas producing movement of the piston member 32 is provided.

It is apparent that the particular manner in which this result is produced provides a fluid cylinder which is compact and in which it is not necessary to extend the overall length as would be necessary if a second rod member were provided. Further, a common fluid delivery means can be utilized to move the piston member in both directions and it is not necessary for the flow rate to be varied depending upon which direction the piston member is to be moved.

It is to be understood that although in describing the operation of the fluid cylinder, the fixture 22 has been described as being fixed and the fixture 38 as being the actuating fixture this could be reversed. The cylinder could be used as well with the fixture 38 fixed and the fixture 22 being used as the actuating fixture.

Figure 3:
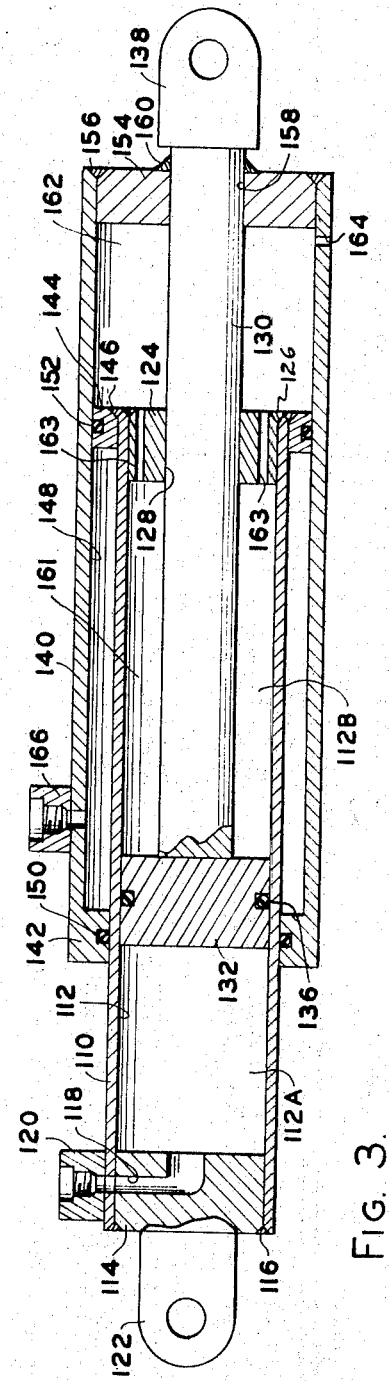
FIG. 3 is a longitudinal cross sectional view similar to FIG. 1 but illustrating another preferred embodiment of the present invention.

FIG. 3 illustrates another preferred embodiment of the present invention substantially similar to the embodiment described above but in which only one side of the piston member is subjected to fluid. The movement in the other direction being produced entirely by the fluid acting on the flange portion of the outer tubular member.

Now referring to FIG. 3, a preferred fluid cylinder is therein illustrated as comprising an inner tubular member 110 defining a fluid chamber 112. The tubular member 110 is closed at one end by a closure member 114. The closure member 114 is preferably secured in place as by welding as indicated at 116. A mounting fixture 122 is formed at the exterior end of the closure member 114.

The opposite end of the tubular member 110 is closed by a guide member 124. The guide member 124 is secured to the end of the tubular member 110 such as by welding as indicated at 126. The guide member 124 is provided with an axially extending opening 128 which axially slidably receives an elongated rod member 130. The rod member 130 extends through the opening 128 into the interior of the tubular member 110 and is secured at its interior end to a piston member 132. The piston member 132 axially slidably engages the inner surface of the tubular member 110 to close one end of the fluid chamber 112. The piston member 132 divides the fluid chamber 112 into two separated chambers 112A–112B. The closure member 114 and the tubular member 110 are provided with a passage 118 connecting the fluid chamber 112A with a port member 120 carried exteriorly of the tubular member 110. An O-ring seal 136 carried by the piston member 132 prevents fluid leakage between the chambers 112A–112B. A connecting fixture 138 is carried at the exterior end of the rod member 130.

The inner tubular member 110 is telescopically received by an outer tubular member 140. The outer tubular member 140 is provided at one end with a radially inwardly extending flange portion 142 which axially slidably engages the outer surface of the inner tubular member 110. A ring member 144 is secured, preferably by welding as indicated at 146, to the exterior surface of the inner tubular member 110 at the end adjacent the guide member 124. The flange portion 142 and the ring member 144 close the ends of an annular fluid chamber 148 formed intermediate the inner tubular member 110 and the outer tubular member 140. O-ring seals 150 and 152 carried by the flange portion 142 and the ring member 144 respectively prevent fluid leakage from the chamber 148. It is to be noted that unlike the embodiment described with reference to FIGS. 1–2 in the embodiment of FIG. 3, the chamber 148 is closed and there is no communication provided between the chamber 148 and the chamber 112B.

An end member 154 closes the end of the tubular member 140 opposite the flange portion 142 and is preferably secured to the tubular member 140 as by welding as indicated at 156. The end member 154 is provided with an axial opening 158 which receives the rod member 130. The rod member 130 and the end member 154 are preferably secured one to the other as by welding as indicated at 160.

An atmosphere chamber 162 is formed in the end of the tubular member 140 intermediate the guide member 124 and the end member 154. Communication between the chambers 112B and 162 is provided by a plurality of passages 163 formed in the guide member 124. A port 164 provided in the tubular member 140 connects the chamber 162 to atmosphere. A fluid port 166 is carried by the tubular member 140 and is connected to the chamber 148 in an area adjacent the flange portion 142.

The embodiment of FIG. 3 operates substantially as described above with reference to FIGS. 1 and 2 except that fluid is not directed to the interior of the tubular member 110 on the right hand side of the piston member 132. Movement of the piston member 132 to the left as seen in FIG. 3 is instead produced by fluid acting on the flange portion 142 only. Thus with a proper selection of the size of the flange portion 142 the effective area utilized to produce movement of the piston member 132 in each direction can be equalized. It is to be noted also that with a proper selection of the size of the flange portion 142 any desired difference in the rate of movement in the two directions can be produced.

Figure 4:
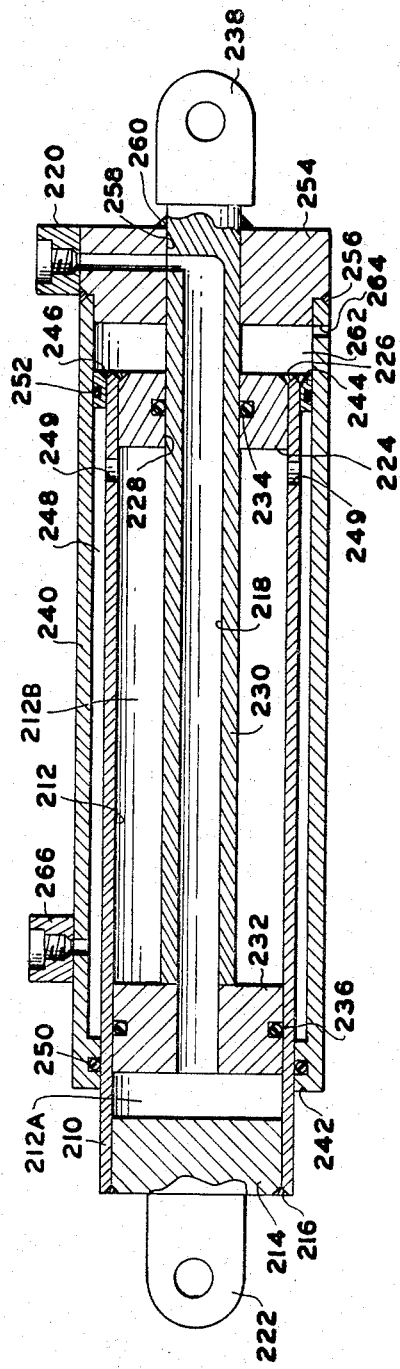
FIG. 4 is a longitudinal cross sectional view similar to FIGS. 1 and 3 but illustrating yet another preferred embodiment of the present invention.

FIG. 4 illustrates yet another preferred embodiment of the present invention substantially similar to the embodiments described above but with one difference over those embodiments. In the embodiments described above, the fluid ports, since they are positioned on members which move relative to each other during operation of the device, they must be connected to the fluid source by a flexible connection of some type. The embodiment of FIG. 4 permits rigid conduits to be connected to the fluid ports since each of the ports is carried by the exterior tubular member.

Now referring to FIG. 4, another preferred fluid cylinder is therein illustrated as comprising an inner tubular member 210 defining a fluid chamber 212. The tubular member 210 is closed at one end by a closure member 214. The closure member 214 is secured to the end of the tubular member 210 in a fluid tight manner such as by welding as indicated at 216. A mounting fixture 222 is formed at the exterior end of the closure member 214.

The opposite end of the tubular member 210 is closed by a guide member 224. The guide member 224 is secured to the end of the tubular member 210 in a fluid tight manner such as by welding as at 226. The guide member 224 is provided with an axially extending opening 228 which axially slidably receives an elongated rod member 230. The rod member 230 extends through the opening 228 into the fluid chamber 212 and is secured at its interior end to a piston member 232. The piston member 232 divides the fluid chamber 212 into two separate chambers 212A and 212B. An O-ring seal 234 carried by the guide member 224 prevents fluid leakage from the fluid chamber 212B along the rod member 230. The piston member 232 axially slidably engages the inner surface of the tubular member 210 and an O-ring seal 236 prevents fluid leakage past the piston member 232. A fixture 238 is carried at the exterior end of the rod member 230.

The inner tubular member 210 is telescopically received by an outer tubular member 240. The outer tubular member 240 is provided at one end with a radially inwardly extending flange portion 242 which axially slidably engages the outer surface of the tubular member 210. A ring member 244 is secured, preferably by welding as indicated at 246, to the exterior surface of the inner tubular member 210 at the end thereof adjacent the guide member 224. The flange portion 242 and the ring member 244 close the ends of an annular fluid chamber 248 formed intermediate the inner tubular member 210 and the outer tubular member 240. O-ring seals 250 and 252 carried by the flange portion 242 and the ring member 244 respectively prevent fluid leakage from the chamber 248. Annularly spaced ports 249 provided in the inner tubular member 210 connect the fluid chamber 212B to the annular chamber 248.

An end member 254 closes the end of the tubular member 240 opposite the flange portion 242 and is preferably secured to the tubular member 240 as by welding as indicated at 256. The end member 254 is provided with an axial opening 258 which receives the rod member 230. The rod member 230 and the end member 254 are preferably secured one to the other as by welding as indicated at 260. A fluid passage 218 extends radially through the end member 254 and axially through the rod member 230 and the piston member 232 to provide communication between a port member 220 carried by the end member 254 and the fluid chamber 212A.

An atmosphere chamber 262 is formed in the end of the tubular member 240 intermediate the guide member 224 and the end member 254 and a port 264 provided in the tubular member 240 connects the chamber 262 to atmosphere. A fluid port 266 is carried by the tubular member 240 and is connected to the chamber 248 in an area adjacent the flange portion 242.

The embodiment illustrated in FIG. 4 operates substantially as described above with respect to the embodiment of FIGS. 1–2 except that by positioning the fluid port 220 on the end member 254, the fluid ports 220 and 266 are maintained in fixed position relative to each other and therefore rigid conduit can be used to connect the ports 220 and 266 to a fluid source.

Figure 5:
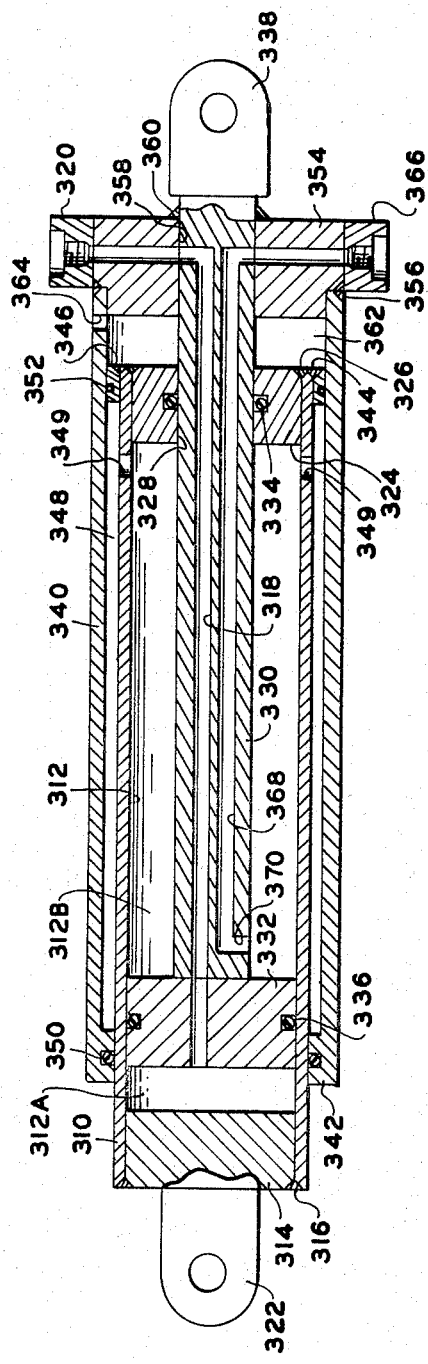
FIG. 5 is a longitudinal cross sectional view illustrating still another preferred embodiment of the present invention.

FIG. 5 discloses still another preferred embodiment of the present invention as comprising an inner tubular member 310 defining a fluid chamber 312. The tubular member 310 is closed at one end by a closure member 314. The closure member 314 is preferably secured in place as by welding as indicated at 316. A mounting fixture 322 is formed at the exterior end of the closure member 314.

The opposite end of the tubular member 310 is closed by a guide member 324. The guide member 324 is secured to the end of the tubular member 310 in a fluid tight manner such as by welding as at 326. The guide member 324 is provided with an axially extending opening 328 which axially slidably receives an elongated rod member 330. The rod member 330 extends through the opening 328 into the fluid chamber 312 and is secured at its interior end to a piston member 332. The piston member 332 divides the fluid chamber 312 into two separate chambers 312A and 312B. An O-ring seal 334 carried by the guide member 324 prevents fluid leakage from the fluid chamber 312B along the rod member 330. The piston member 332 axially slidably engages the inner surface of the tubular member 310 and an O-ring 336 prevents fluid leakage past the piston member 332. A fixture 338 is carried at the exterior end of the rod member 330.

The inner tubular member 310 is telescopically received by an outer tubular member 340. The outer tubular member 340 is provided at one end with a radially inwardly extending flange portion 342 which axially slidably engages the outer surface of the tubular member 310. A ring member 344 is secured, preferably by welding as indicated at 346, to the exterior surface of the inner tubular member 310 at the end thereof adjacent the guide member 324. The flange portion 342 and the ring member 344 close the ends of an annular fluid chamber 348 formed intermediate the inner tubular member 310 and the outer tubular member 340. O-ring seals 350 and 352 carried by the flange portion 342 and the ring member 344 respectively prevent fluid leakage from the chamber 348. Annularly spaced ports 349 provided in the inner tubular member 310 connect the fluid chamber 312B to the annular chamber 348.

An end member 354 closes the end of the tubular member 340 opposite the flange portion 342 and is preferably secured to the tubular member 340 as by welding as indicated at 356. The end member 354 is provided with an axial opening 358 which receives the rod member 330. The rod member 330 and the end member 354 are preferably secured one to the other as by welding as indicated at 360. A fluid passage 318 extends radially through the end member 354 and axially through the rod member 330 and the piston member 332 to provide communication between a port member 320 carried by the end member 354 and the fluid chamber 312A. A second fluid passage 368 extends radially through the end member 354 and axially through the rod member 330 and spaced from the passage 318 and intersects a radial passage 370 provided in the rod member 330 to provide communication between a port member 366 carried by the end member 354 and the fluid chamber 312B.

An atmosphere chamber 362 is formed in the end of the tubular member 340 intermediate the guide member 324 and the end member 354 and a port 364 provided in the tubular member 340 connects the chamber 362 to atmosphere.

The embodiment illustrated in FIG. 5 operates substantially as described above and like the embodiment of FIG. 4, the ports 320 and 366 by both being carried on the end member 354 are maintained in a fixed relative position and therefore rigid conduits can be used to connect the ports 320 and 366 to a fluid source.

Although I have described several embodiments of my invention, it is apparent that many other changes and modifications can be made therein without departing from the spirit of the invention as expressed by the appended claims.

I claim:
1. A fluid cylinder comprising
   (a) a first tubular member and means closing the ends of said first tubular member to define a closed fluid chamber,
   (b) a piston mounted in said chamber for reciprocal movement relative to said tubular member,
   (c) means for connecting said chamber to a source of fluid pressure to move said piston and said tubular member relative to one another,
   (d) a rod connected to one side of said piston and movable therewith,
   (e) a second tubular member telescopically received by said first tubular member and radially spaced therefrom to define a second fluid chamber.
   (f) a fluid actuated member in said second chamber movable in response to an increase in fluid in said second fluid chamber and means for connecting said second fluid chamber to said fluid pressure source to product movement of said fluid actuated member.
   (g) means connecting said fluid actuated member to said piston to produce movement thereof in response to movement of said actuated member.
   (h) said fluid actuated member being operable upon an increase in fluid in said second chamber to move said piston in a direction opposite the side of said piston connected to said rod.

2. The fluid cylinder as defined in claim 1 and in which the area of said fluid actuated member exposed to fluid in said second fluid chamber is substantially equal to the transverse cross-sectional area of said rod.

3. The fluid cylinder as defined in claim 1 and in which said piston has a side opposite that which is connected to said rod and which is exposed to fluid in said first fluid chamber, the area of said fluid actuated member exposed to fluid in said second fluid chamber plus the area of said piston on the rod side thereof exposed to fluid in said first fluid chamber is substantially equal to the area of said piston exposed to fluid in said first fluid chamber on the side opposite said rod.

4. A fluid cylinder comprising
   (a) a first tubular member and means closing the ends of said first tubular member to define a first fluid chamber,
   (b) a piston mounted for reciprocal movement in said chamber relative to said first tubular member,
   (c) a rod member having one end connected to said piston for movement therewith and the opposite end extending exteriorly of said first fluid chamber,
   (d) means for connecting said first fluid chamber on the side of said piston opposite said rod member to a source of fluid pressure to thereby produce movement of said piston toward the rod member side thereof,
   (e) means defining a second fluid chamber spaced concentrically around said first chamber,
   (f) a fluid actuated member in said second chamber and operable to move in one direction upon an increase in fluid in said second fluid chamber,
   (g) means for connecting said second fluid chamber to said fluid pressure source to thereby produce movement of said fluid actuated member, and
   (h) means connecting said fluid actuated member to said rod member whereby to produce movement of said piston in a direction opposite to the side of said piston connected to said rod member upon an increase in fluid in said second fluid chamber.

5. The fluid cylinder as defined in claim 4 and in which said first mentioned fluid connecting means comprises a passage extending through said rod member and said piston.

6. A fluid cylinder comprising
   (a) a first tubular member and means closing the ends of said first tubular member to define a first fluid chamber,
   (b) a piston mounted for reciprocal movement in said chamber relative to said first tubular member,
   (c) a rod having one end connected to said piston for movement therewith and the opposite end extending exteriorly of said first fluid chamber,
   (d) means for connecting said first fluid chamber on the side of said piston opposite said rod to a source of fluid pressure to thereby produce movement of said piston toward the rod side thereof,
   (e) means defining a second fluid chamber spaced concentrically around said first chamber,
   (f) a fluid actuated member in said second chamber and operable to move in one direction upon an increase in fluid in said second fluid chamber,
   (g) means for connecting said second fluid chamber to said fluid pressure source to thereby produce movement of said fluid actuated member, and
   (h) means connecting said fluid actuated member to said rod whereby to produce movement of said piston in a direction opposite to the side of said piston connected to said rod upon an increase in fluid in said second fluid chamber, and
   (i) means connecting said fluid pressure source to the side of said piston connected to said rod.

7. The fluid cylinder as defined in claim 6 and in which the area of said fluid actuated member exposed to fluid in said second fluid chamber plus the area of said piston exposed to fluid on the rod side thereof is substantially equal to the area of said piston exposed to fluid on the side opposite said rod.

8. The fluid cylinder as defined in claim 6 and in which the area of said fluid actuated member exposed to fluid in said second fluid chamber is substantially equal to the transverse cross-sectional area of said rod.

9. A fluid cylinder comprising:
   (a) a first elongated fluid chamber,
   (b) a second fluid chamber spaced concentrically around said first fluid chamber,
   (c) a piston disposed in said first fluid chamber for reciprocal movement therein,
   (d) a piston rod extending axially from one side of said piston,
   (e) a source of fluid pressure connected to said first chamber on each side of said piston so as to move said piston reciprocally within said first fluid chamber,
   (f) means carried by said piston rod and disposed in said second fluid chamber, and
   (g) connections between said fluid pressure source and said second chamber operable to introduce fluid to said second chamber to cause said piston rod carried means to move said piston and said first chamber relative to one another in at least one direction.

10. A fluid cylinder comprising,
(a) means defining a first elongated fluid chamber,
(b) means defining a second fluid chamber spaced concentrically around said first fluid chamber,
(c) a piston disposed in said first fluid chamber for reciprocal movement therein,
(d) a piston rod extending axially from one side of said piston,
(e) means for connecting a source of fluid pressure to said first chamber on each side of said piston so as to move said piston reciprocally relative to said first fluid chamber,
(f) means carried by said piston rod disposed in said second fluid chamber, and
(g) connections between said fluid pressure source and said second chamber operable to introduce fluid to said second chamber to cause said piston rod carried means to move said piston and said first chamber relative to one another in at least one direction.

11. A fluid cylinder comprising,
(a) a first tubular member defining a first elongated fluid chamber,
(b) a second tubular member axially receiving said first tubular member and defining a second fluid chamber spaced concentrically around said first fluid chamber,
(c) a piston disposed in said first fluid chamber for reciprocal movement within said first tubular member,
(d) a piston rod extending axially from one side of said piston,
(e) means for connecting a source of fluid pressure to said first chamber so as to move said piston relative to said first tubular member toward a first position within said first fluid chamber,
(f) said second tubular member having an inwardly extending flange portion at one end thereof engaging the outer surface of said first tubular member and enclosing the end of said second fluid chamber,
(g) said second tubular member being secured to said piston rod so that said piston and said second tubular member move together, and
(h) connections between said fluid pressure source and said second chamber operable to introduce fluid to said second chamber to cause said flange portion and said second tubular member to move said piston and said first tubular member relative to one another toward a position opposite to said first position.

12. A fluid cylinder comprising,
(a) an inner tubular member defining a first fluid chamber,
(b) means closing one end of said inner tubular member to thereby close one end of said first fluid chamber,
(c) means closing the opposite end of said inner tubular member to close the opposite end of said chamber,
(d) said last mentioned closing means being provided with an axial, central opening,
(e) a piston disposed in said first fluid chamber for reciprocal movement within said inner tubular member,
(f) a rod member secured to one side of said piston and extending through said opening in said closure means,
(g) means for connecting a source of fluid pressure to said first chamber on opposite sides of said piston,
(h) an outer tubular member telescopically receiving said inner tubular member and provided at one end with a radially inwardly extending flange portion axially slidably engaging the outer surface of said inner tubular member,
(i) means engaging the inner annular surface of said outer member to define a second fluid chamber concentrically disposed about said first fluid chamber and defined by the inner surface of said outer tubular member and the outer surface of said inner tubular member, said engaging means and said flange portion,
(j) said outer tubular member being secured to said rod member so that said piston and said outer tubular member move together, and
(k) means for connecting a source of fluid pressure to said second fluid chamber to cause said flange portion and said outer tubular member to move said piston and said inner tubular member relative to one another.

13. The fluid cylinder as defined in claim 12 and including means formed in said inner tubular member for connecting said first fluid chamber on the rod member side of said piston to said second fluid chamber.

14. A fluid cylinder comprising
(a) a first tubular member and means closing the ends of said first tubular member to define a first fluid chamber,
(b) a piston mounted for reciprocal movement in said chamber relative to said first tubular member,
(c) a rod member having one end connected to said piston for movement therewith and the opposite end extending exteriorly of said first fluid chamber,
(d) means for connecting said first fluid chamber on the side of said piston opposite said rod member to a source of fluid pressure to thereby produce movement of said piston toward the rod member side thereof,
(e) means defining a second fluid chamber spaced concentrically around said first chamber,
(f) a fluid actuated member in said second chamber and operable to move in one direction upon an increase in fluid in said second fluid chamber,
(g) means for connecting said second fluid chamber to said fluid pressure source to thereby produce movement of said fluid actuated member, and
(h) means connecting said fluid actuated member to said rod member whereby to produce movement of said piston in a direction opposite to the side of said piston connected to said rod member upon an increase in fluid in said second fluid chamber, and
(i) said second mentioned fluid connecting means comprising a passage provided in said rod member.

15. A fluid cylinder comprising
(a) a first tubular member and means closing the ends of said first tubular member to define a first fluid chamber,
(b) a piston mounted for reciprocal movement in said chamber relative to said first tubular member,
(c) a rod member having one end connected to said piston for movement therewith and the opposite end extending exteriorly of said first fluid chamber,
(d) means for connecting said first fluid chamber on the side of said piston opposite said rod member to a source of fluid pressure to thereby produce movement of said piston toward the rod member side thereof,
(e) means defining a second fluid chamber spaced concentrically around said first chamber,
(f) a fluid actuated member in said second chamber and operable to move in one direction upon an increase in fluid in said second fluid chamber,
(g) means for connecting said second fluid chamber to said fluid pressure source to thereby produce movement of said fluid actuated member, and
(h) means connecting said fluid actuated member to said rod member whereby to produce movement of said piston in a direction opposite to the side of said piston connected to said rod member upon an increase in fluid in said second fluid chamber, and
(i) each of said fluid connecting means comprising a passage provided in said rod member.

(References on following page)

References Cited

UNITED STATES PATENTS

| | | | |
|---|---|---|---|
| 227,828 | 5/1880 | Perkins | 92—152 |
| 825,866 | 7/1906 | Rogers | 92—151 X |
| 1,734,795 | 11/1929 | Claxton | 92—108 X |
| 1,845,797 | 2/1932 | Kearney | 92—52 |
| 2,577,462 | 12/1951 | Hackney | 92—61 X |
| 2,983,256 | 5/1961 | Seeloff | 92—151 X |
| 3,021,015 | 2/1962 | Bowman | 212—145 |
| 3,186,305 | 6/1965 | Lorimer | 89—37 |

MARTIN P. SCHWADRON, *Primary Examiner.*

I. C. COHEN, *Assistant Examiner.*